(12) United States Patent  
Chen et al.

(10) Patent No.: US 10,401,551 B2  
(45) Date of Patent: Sep. 3, 2019

(54) BACKLIGHT MODULE AND DISPLAY DEVICE

(71) Applicant: Wuhan China Star Optoelectronics Technology Co., Ltd., Wuhan, Hubei (CN)

(72) Inventors: Qian Chen, Guangdong (CN); Zhongjie Liu, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 76 days.

(21) Appl. No.: 15/556,464

(22) PCT Filed: Jun. 23, 2017

(86) PCT No.: PCT/CN2017/089706  
§ 371 (c)(1),  
(2) Date: Sep. 7, 2017

(87) PCT Pub. No.: WO2018/223431  
PCT Pub. Date: Dec. 13, 2018

(65) Prior Publication Data  
US 2018/0356581 A1  Dec. 13, 2018

(51) Int. Cl.  
*F21V 8/00* (2006.01)

(52) U.S. Cl.  
CPC .................. *G02B 6/005* (2013.01)

(58) Field of Classification Search  
CPC .............. G02B 6/005; G02B 6/0055  
See application file for complete search history.

(56) References Cited

U.S. PATENT DOCUMENTS

2012/0307519 A1   12/2012  Sakai  
2016/0327718 A1*  11/2016  Liu .................. G02B 6/005

FOREIGN PATENT DOCUMENTS

| CN | 201673274 U | * | 12/2010 |
| CN | 201673274 U |   | 12/2010 |
| CN | 102182961 A |   | 9/2011  |
| CN | 203811946 U |   | 9/2014  |
| CN | 203868938 U | * | 10/2014 |
| CN | 203868938 U |   | 10/2014 |
| CN | 204062650 U |   | 12/2014 |
| CN | 204314572 U |   | 5/2015  |

(Continued)

*Primary Examiner* — David V Bruce  
(74) *Attorney, Agent, or Firm* — Andrew C. Cheng

(57) ABSTRACT

The present invention provides a backlight module and a display device, the backlight module comprises a light guide plate, a light bar and a light blocking tape, the light guide plate comprises a light entrance surface and three peripheral side surfaces, the light bar provides a light source for the light guide plate on one side of the light entrance surface, and the light blocking tape covers the three peripheral side surfaces to prevent light that from the light source entering the light guide plate from being emitted from three peripheral side surfaces. So that there is not light leakage in the three peripheral side surfaces, the plastic frame of the prior art for providing to prevent leakage of the three peripheral side surfaces, is eliminated, thereby reducing the weight and width of the backlight module to achieve which to be light and narrow, and reducing production costs.

12 Claims, 2 Drawing Sheets

(56) References Cited

FOREIGN PATENT DOCUMENTS

| | | | |
|---|---|---|---|
| CN | 205121112 U | | 3/2016 |
| CN | 205844707 U | | 12/2016 |
| CN | 106444151 A | | 2/2017 |
| CN | 205982938 U | * | 2/2017 |
| CN | 205982938 U | | 2/2017 |
| JP | H0996814 A | | 4/1997 |
| JP | 2009080917 A | | 4/2009 |

* cited by examiner

BACKLIGHT MODULE AND DISPLAY DEVICE

FIELD OF THE INVENTION

The present invention relates to a technology of display, and more particularly, to a backlight module and a display device.

DESCRIPTION OF PRIOR ART

Liquid crystal display is widely used in the display, because the liquid crystal molecules cannot self-luminous, therefore, LCD generally have a backlight module to provide a light source to the liquid crystal molecules.

In general, the backlight module comprises a light bar, and a light guide plate, and the light guide plate comprises a light entrance surface, three peripheral side surfaces, and a light exit surface. Light is emitted to the light guide plate from one side of the light entrance surface by the light bar, and light is emitted to the liquid crystal molecules from the light exit surface to provide a light source to the liquid crystal molecules. In the prior art, in order to prevent light that from being emitted from the three peripheral side surfaces of the light guide plate, it is generally used to set a plastic frame at the corresponding positions on the three peripheral side surfaces, the plastic frame blocks the light emitted from the three peripheral side surfaces so that the backlight module does not leak light. However, using this method, the existence of plastic box will increase the weight and width of the backlight module.

SUMMARY OF THE INVENTION

The present invention mainly provides a backlight module and a display device to solve the problem that the backlight module is not light and narrow.

In order to solve the above-mentioned technical problems, a technical solution adopted by the present invention is to provide a backlight module, wherein the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces; wherein the light guide plate further comprises a light exit surface and a bottom surface arranged opposite to the light exit surface, the light blocking tape comprises an upper adhered edge, a side adhered edge, and a bottom adhered edge, and the upper adhered edge and the bottom adhered edge are attached respectively to the edges of the light exit surface and the bottom surface, the side adhered edges are attached to the three peripheral side surfaces; and wherein the size of the light guide plate on the side of the light entrance surface is larger than the size of the light guide plate on one side of the peripheral side opposite to the light entrance surface.

In order to solve the above-mentioned technical problems, a technical solution adopted by the present invention is to provide a backlight module, wherein the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces.

In order to solve the above-mentioned technical problems, a technical solution further adopted by the present invention is to provide a display device, wherein the display device comprises a relatively arranged display module and a backlight module, the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces.

The present invention can be concluded with the following advantages, the method provided by the present invention is different from the prior art that the light blocking tape covers the three peripheral side surfaces to prevent light that from the light source entering the light guide plate from being emitted from three peripheral side surfaces. So that in the case that there is not light leakage in the three peripheral side surfaces, the plastic frame of the prior art for providing to prevent leakage of the three peripheral side surfaces, is eliminated, thereby reducing the weight and width of the backlight module to achieve the backlight module to be light and narrow, and reducing production costs.

DESCRIPTION OF PREFERRED EMBODIMENT

Technical implementation will be described below clearly and fully by combining with drawings made in accordance with an embodiment in the present invention.

Figure 1:
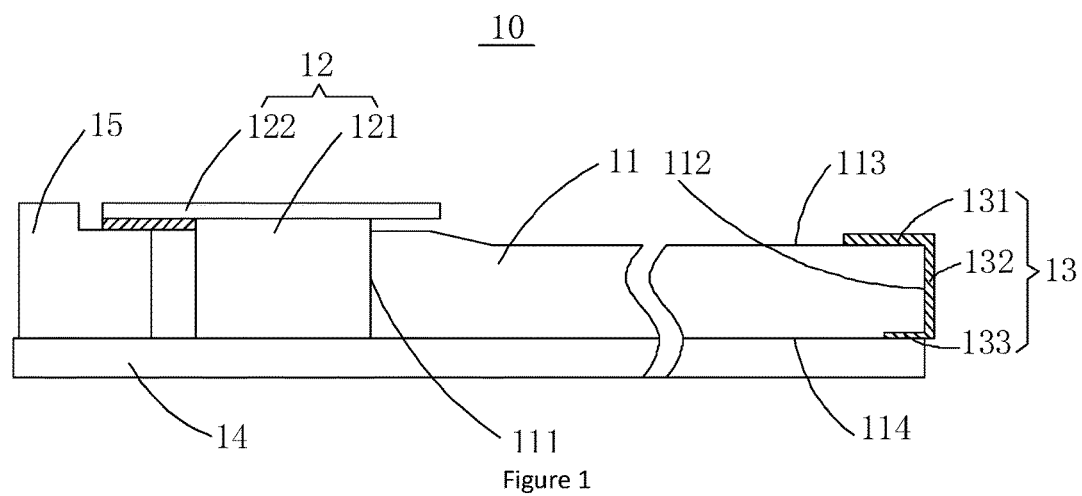
FIG. 1 is a structural illustration of the first embodiment in accordance to a backlight module provided by the present invention.
Figure 2:
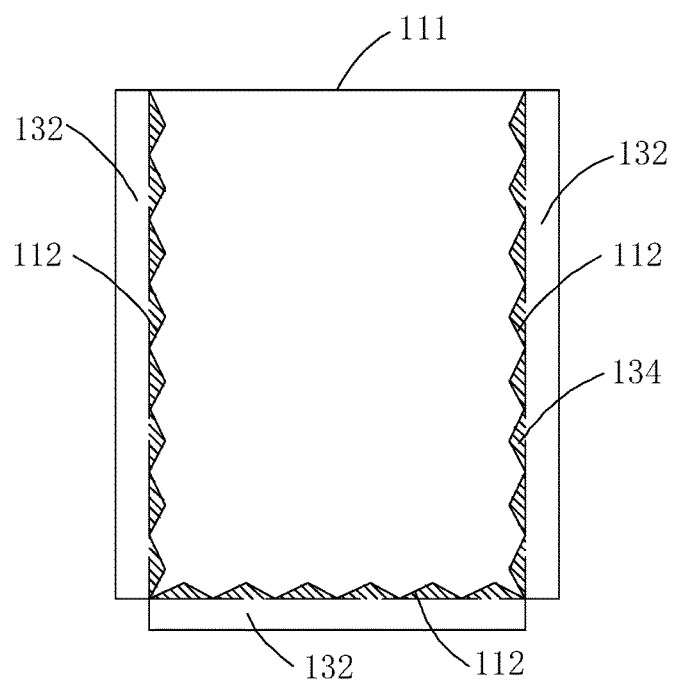
FIG. 2 is a structural illustration of the adhering of the light blocking tape and the side adhered edge in FIG. 1.

Referring to FIG. 1 and FIG. 2, the backlight module 10 of the first embodiment provided by the present invention comprises a light guide plate 11, a light bar 12 and a light blocking tape 13.

The light guide plate 11 comprises a light entrance surface 111 and three peripheral side surfaces 112, and further comprises a light exit surface 113 and a bottom surface 114 arranged opposite to the light exit surface 113.

Wherein, the three peripheral side surfaces 112 are serrated shapes, and the size of the light guide plate 11 on the side of the light entrance surface 111 is larger than the size of the light guide plate 11 on one side of the peripheral side 112 opposite to the light entrance surface 111, i.e., the height of the left side of the light guide plate 11 is larger than the height of the right side of the light guide plate 11 shown in FIG. 1.

The light bar 12 provides a light source for the light guide plate 11 on one side of the light entrance surface 111 of the light guide plate 11.

Wherein the light bar 12 comprise a LED121 and a FPC122 for supplying power to the LED121.

The light blocking tape 13 covers the three peripheral side surfaces 112 of the light guide plate 11, to prevent light that from the light source of the light bar 12 entering the light guide plate 11, from being emitted from three peripheral side surfaces 112.

Wherein the light blocking tape 13 comprises an upper adhered edge 131, a side adhered edge 132, and a bottom adhered edge 133. The upper adhered edge 131 is attached to the edge of the light exit surface 113 of the light guide plate 11, the side adhered edges 132 are attached to the three peripheral side surfaces 112, and bottom adhered edge 133 is attached to the edge of the bottom surface 114. So that the light blocking tape 13 covers the light guide plate 11 and completely covers the three peripheral side surfaces 112, and when light entering the light guide plate 11 is directed toward the three peripheral side surfaces 112, the light is blocked by the light blocking tape 13 and is not emitted.

Further, the side adhered edges 132 are adhered to three peripheral side surfaces 112 of serrated shape by glue 134. The three peripheral side surfaces 112 of serrated shape can increase the contact area with the glue 134, i.e., the area of adhesion of the glue 134 is increased, so that the adhesion strength of the three peripheral side surfaces 112 and the side adhered edges 132 of the light blocking tape 13 is increased.

Alternatively, the light blocking tape 13 of the present embodiment is a black opaque tape, and the glue 134 is a black glue.

Further referring to FIG. 1, a reflection sheet 14 is further arranged on one side of the bottom surface 114 of the light guide plate 11, and a rubber frame 15 is further arranged on the side of the light bar 12 away from the light guide plate 11.

Wherein the reflection sheet 14 is used for reflecting the light emitted from the bottom surface 114 to the light guide plate 11 when light entering the light guide plate 11 is emitted from the bottom surface 114, increasing the utility rate of light. The rubber frame 15 is used for supporting.

Figure 3:
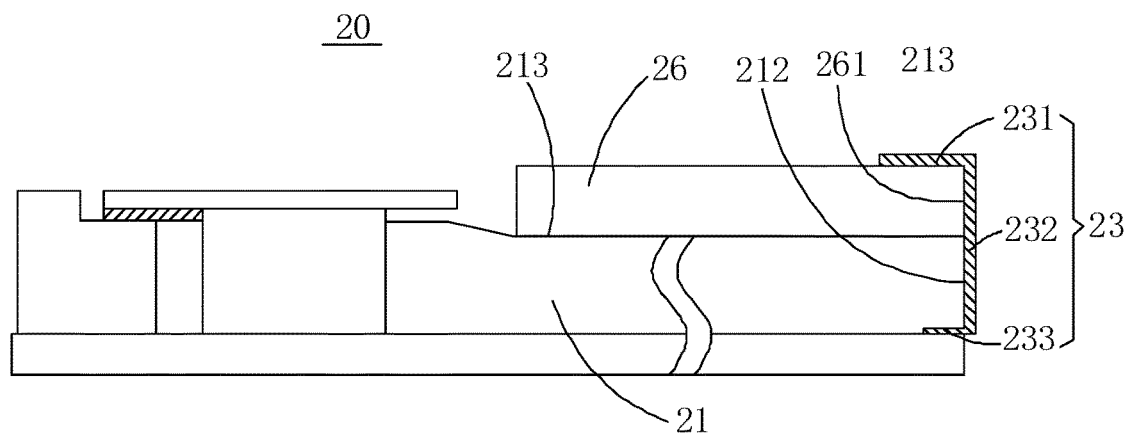
FIG. 3 is a structural illustration of the second embodiment in accordance to a backlight module provided by the present invention.

Referring to FIG. 3, the light guide plate 21 in the backlight module 20 of the second embodiment provided in the present invention is the same as the light guide plate 11 in the above-described first embodiment, therefore no additional description is given herebelow. The light blocking tape 23 of the present invention comprises an upper adhered edge 231, a side adhered edge 232, and a bottom adhered edge 233.

Wherein an optical diaphragm group 26 is further arranged between the upper adhered edge 231 and the light exit surface 213 of the light guide plate 21. The upper adhered edge 231 is attached to the edge of the optical diaphragm group 26 away from the light exit surface 213, and the side adhered edge 232 is attached to the three peripheral side surfaces 212 of the light guide plate 21 and the three peripheral side surfaces 261 of the optical diaphragm group 26 corresponding to the three peripheral side surfaces 212 of the light guide plate 21. So that the upper adhered edge 231 and side adhered edge 232 cover the optical diaphragm group 26 and the three peripheral side surfaces 212 of the light guide plate 21 together.

The other structures in the present embodiment are the same as those in the above-described first embodiment, therefore no additional description is given herebelow.

Figure 4:
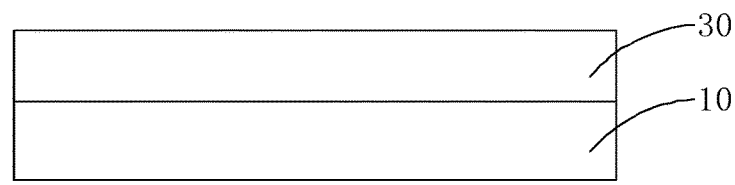
FIG. 4 is a structural illustration of the first embodiment in accordance to a display device provided by the present invention.

Referring to FIG. 1, FIG. 2, and FIG. 4, the display device of the first embodiment provided by the present invention comprises a display module 30 and a backlight module 10 in the above-described first embodiment arranged opposite to the display module 30.

Wherein the backlight module 10 comprises a light guide plate 11, a light bar 12 and a light blocking tape 13.

The light guide plate 11 comprises a light entrance surface 111 and three peripheral side surfaces 112, and further comprises a light exit surface 113 and a bottom surface 114 arranged opposite to the light exit surface 113.

Wherein, the three peripheral side surfaces 112 are serrated shapes, and the size of the light guide plate 11 on the side of the light entrance surface 111 is larger than the size of the light guide plate 11 on one side of the peripheral side 112 opposite to the light entrance surface 111, i.e., the height of the left side of the light guide plate 11 is larger than the height of the right side of the light guide plate 11 shown in FIG. 1.

The light bar 12 provides a light source for the light guide plate 11 on one side of the light entrance surface 111 of the light guide plate 11.

Wherein the light bar 12 comprise a LED121 and a FPC122 for supplying power to the LED121.

The light blocking tape 13 covers the three peripheral side surfaces 112 of the light guide plate 11, to prevent light that from the light source of the light bar 12 entering the light guide plate 11, from being emitted from three peripheral side surfaces 112.

Wherein the light blocking tape 13 comprises an upper adhered edge 131, a side adhered edge 132, and a bottom adhered edge 133. The upper adhered edge 131 is attached to the edge of the light exit surface 113 of the light guide plate 11, the side adhered edges 132 are attached to the three peripheral side surfaces 112, and bottom adhered edge 133 is attached to the edge of the bottom surface 114. So that the light blocking tape 13 covers the light guide plate 11 and completely covers the three peripheral side surfaces 112, and when light entering the light guide plate 11 is directed toward the three peripheral side surfaces 112, the light is blocked by the light blocking tape 13 and is not emitted.

Further, the side adhered edges 132 are adhered to three peripheral side surfaces 112 of serrated shape by glue 134. The three peripheral side surfaces 112 of serrated shape can increase the contact area with the glue 134, i.e., the area of adhesion of the glue 134 is increased, so that the adhesion strength of the three peripheral side surfaces 112 and the side adhered edges 132 of the light blocking tape 13 is increased.

Alternatively, the light blocking tape 13 of the present embodiment is a black opaque tape, and the glue 134 is a black glue.

Further referring to FIG. 1, a reflection sheet 14 is further arranged on one side of the bottom surface 114 of the light guide plate 11, and a rubber frame 15 is further arranged on the side of the light bar 12 away from the light guide plate 11.

Wherein the reflection sheet 14 is used for reflecting the light emitted from the bottom surface 114 to the light guide plate 11 when light entering the light guide plate 11 is emitted from the bottom surface 114, increasing the utility rate of light. The rubber frame 15 is used for supporting.

Figure 5:
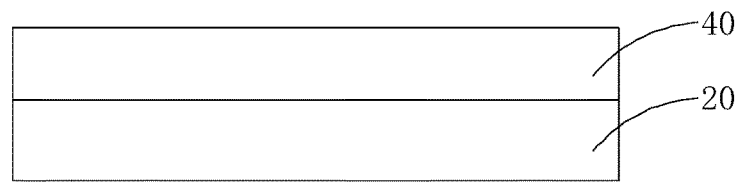
FIG. 5 is a structural illustration of the second embodiment in accordance to a display device provided by the present invention.

Referring to FIG. 3 and FIG. 5, the display device of the second embodiment provided by the present invention comprises a display module 40 and a backlight module 20 in the above-described first embodiment arranged opposite to the display module 40.

Wherein the light guide plate 21 in the backlight module 20 of the second embodiment provided in the present invention is the same as the light guide plate 11 in the above-described first embodiment, therefore no additional description is given herebelow. The light blocking tape 23 of the present invention comprises an upper adhered edge 231, a side adhered edge 232, and a bottom adhered edge 233.

Wherein an optical diaphragm group 26 is further arranged between the upper adhered edge 231 and the light exit surface 213 of the light guide plate 21. The upper adhered edge 231 is attached to the edge of the optical diaphragm group 26 away from the light exit surface 213, and the side adhered edge 232 is attached to the three peripheral side surfaces 212 of the light guide plate 21 and the three peripheral side surfaces 261 of the optical diaphragm group 26 corresponding to the three peripheral side surfaces 212 of the light guide plate 21. So that the upper adhered edge 231 and side adhered edge 232 cover the optical diaphragm group 26 and the three peripheral side surfaces 212 of the light guide plate 21 together.

The other structures in the present embodiment are the same as those display devices in the above-described first embodiment, therefore no additional description is given herebelow.

The method provided by the present invention is different from the prior art that the light blocking tape covers the three peripheral side surfaces to prevent light that from the light source entering the light guide plate from being emitted from three peripheral side surfaces. So that in the case that there is not light leakage in the three peripheral side surfaces, the plastic frame of the prior art for providing to prevent leakage of the three peripheral side surfaces, is eliminated, thereby reducing the weight and width of the backlight module to achieve the backlight module to be light and narrow, and reducing production costs.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backlight module, wherein the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces;

wherein the light guide plate further comprises a light exit surface and a bottom surface arranged opposite to the light exit surface, the light blocking tape comprises an upper adhered edge, a side adhered edge, and a bottom adhered edge, and the upper adhered edge and the bottom adhered edge are attached respectively to the edges of the light exit surface and the bottom surface, the side adhered edges are attached to the three peripheral side surfaces;

and wherein the size of the light guide plate on the side of the light entrance surface is larger than the size of the light guide plate on one side of the peripheral side opposite to the light entrance surface;

wherein the three peripheral side surfaces are serrated shapes, the side adhered edges are adhered to three peripheral side surfaces of serrated shape by glue.

2. The backlight module as recited in claim 1, wherein an optical diaphragm group is further arranged between the upper adhered edge and the light exit surface, and the upper adhered edge and the side adhered edge surround the optical diaphragm group and the three peripheral side surfaces together.

3. The backlight module as recited in claim 1, wherein a reflection sheet is arranged on one side of the bottom surface, and the reflection sheet is used for reflecting the light emitted from the bottom surface to the light guide plate.

4. The backlight module as recited in claim 1, wherein two sides of each serration of the three peripheral side surfaces have a same length.

5. A backlight module, wherein the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces;

wherein the light guide plate further comprises a light exit surface and a bottom surface arranged opposite to the light exit surface, the light blocking tape comprises an upper adhered edge, a side adhered edge, and a bottom adhered edge, and the upper adhered edge and the bottom adhered edge are attached respectively to the edges of the light exit surface and the bottom surface, the side adhered edges are attached to the three peripheral side surfaces; and the three peripheral side surfaces are serrated shapes, the side adhered edges are adhered to three peripheral side surfaces of serrated shape by glue.

6. The backlight module as recited in claim 5, wherein an optical diaphragm group is further arranged between the upper adhered edge and the light exit surface, and the upper adhered edge and the side adhered edge surround the optical diaphragm group and the three peripheral side surfaces together.

7. The backlight module as recited in claim 5, wherein a reflection sheet is arranged on one side of the bottom surface, and the reflection sheet is used for reflecting the light emitted from the bottom surface to the light guide plate.

8. The backlight module as recited in claim 5, wherein two sides of each serration of the three peripheral side surfaces have a same length.

9. A display device, wherein the display device comprises a relatively arranged display module and a backlight module, the backlight module comprises a light guide plate, a light bar and a light blocking tape, the light guide plate comprises a light entrance surface and three peripheral side surfaces, the light bar provides a light source for the light guide plate on one side of the light entrance surface of the light guide plate, and the light blocking tape covers the three peripheral side surfaces to prevent light that from the light source entering the light guide plate from being emitted from three peripheral side surfaces;

wherein the light guide plate further comprises a light exit surface and a bottom surface arranged opposite to the light exit surface, the light blocking tape comprises an upper adhered edge, a side adhered edge, and a bottom adhered edge, and the upper adhered edge and the bottom adhered edge are attached respectively to the edges of the light exit surface and the bottom surface, the side adhered edges are attached to the three peripheral side surfaces; and the three peripheral side surfaces are serrated shapes, the side adhered edges are adhered to three peripheral side surfaces of serrated shape by glue.

10. The display device as recited in claim 9, wherein an optical diaphragm group is further arranged between the upper adhered edge and the light exit surface, and the upper adhered edge and the side adhered edge surround the optical diaphragm group and the three peripheral side surfaces together.

11. The backlight module as recited in claim 9, wherein a reflection sheet is arranged on one side of the bottom surface, and the reflection sheet is used for reflecting the light emitted from the bottom surface to the light guide plate.

12. The display device as recited in claim 9, wherein two sides of each serration of the three peripheral side surfaces have a same length.

* * * * *